(12) United States Patent
Herscovici et al.

(10) Patent No.: US 8,472,920 B2
(45) Date of Patent: *Jun. 25, 2013

(54) SYSTEM AND METHOD FOR PROVIDING WIRELESS NETWORKS AS A SERVICE

(75) Inventors: Bernard Herscovici, Ottawa (CA); Stephen Rayment, Kanata (CA)

(73) Assignee: BelAir Networks Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/338,511

(22) Filed: Dec. 28, 2011

(65) Prior Publication Data

US 2012/0122424 A1 May 17, 2012

Related U.S. Application Data

(63) Continuation-in-part of application No. 12/433,491, filed on Apr. 30, 2009, which is a continuation-in-part of application No. 12/358,049, filed on Jan. 22, 2009.

(51) Int. Cl.
*H04M 1/66* (2006.01)
*H04W 4/00* (2009.01)

(52) U.S. Cl.
USPC .......................................... 455/411; 370/338

(58) Field of Classification Search
USPC ....................................................... 455/411
See application file for complete search history.

(56) References Cited

U.S. PATENT DOCUMENTS

| | | | |
|---|---|---|---|
| 5,559,955 A | 9/1996 | Dev et al. | |
| 6,400,722 B1 * | 6/2002 | Chuah et al. | 370/401 |
| 7,325,246 B1 * | 1/2008 | Halasz et al. | 726/2 |
| 7,420,956 B2 | 9/2008 | Karaoguz et al. | |
| 7,441,043 B1 | 10/2008 | Henry et al. | |
| 7,499,438 B2 | 3/2009 | Hinman et al. | |
| 7,596,614 B2 | 9/2009 | Saunderson et al. | |
| 7,639,656 B2 | 12/2009 | Dooley et al. | |
| 7,643,451 B2 | 1/2010 | He et al. | |
| 7,701,968 B2 | 4/2010 | Cheng | |
| 7,796,594 B2 * | 9/2010 | Melman et al. | 370/389 |
| 7,796,597 B2 | 9/2010 | Giovanni | |
| 7,861,076 B2 | 12/2010 | Ponnapalli et al. | |
| 2003/0005152 A1 * | 1/2003 | Diwan et al. | 709/239 |
| 2005/0141447 A1 * | 6/2005 | Carlton et al. | 370/328 |

(Continued)

FOREIGN PATENT DOCUMENTS

WO 2005112598 A1 12/2005

OTHER PUBLICATIONS

International Search Report for International Application No. PCTICA201 0/00049, with a mailing date of Mar. 22, 2010.

(Continued)

*Primary Examiner* — Brandon Renner
*Assistant Examiner* — Gerald Smarth
(74) *Attorney, Agent, or Firm* — Katten Muchin Rosenman LLP (57) ABSTRACT

A wireless network system is provided. The system comprises a wireless network controller and a plurality of access points and/or femtocells. The wireless network controller is in communication with each of the plurality of access points and/or femtocells via an access data network, and is configured to perform one or more network control functions for the benefit of the plurality of access points and/or femtocells. The network control functions may be selected from management and operation, client authentication, mobility, and per-user administration. The wireless network controller is remotely located and operated with respect to the plurality of access points and/or femtocells.

30 Claims, 5 Drawing Sheets

U.S. PATENT DOCUMENTS

| | | | |
|---|---|---|---|
| 2008/0043686 A1* | 2/2008 | Sperti et al. | 370/338 |
| 2008/0175208 A1 | 7/2008 | Oba et al. | |
| 2008/0217391 A1 | 9/2008 | Roof et al. | |
| 2010/0290337 A1 | 11/2010 | Suvi et al. | |

OTHER PUBLICATIONS

Written Opinion of the International Searching Authority for International Application No. PCT/CA2010/00049, with a mailing date of Mar. 22, 2010.

International Preliminary Report on Patentability for International Application No. PCT/CA2010/00049, with a mailing date of Jul. 26, 2011.

Tatara Systems : "What is a Femtocell?", http://www.tatarasystems.com/ (Retrieved Dec. 1, 2011).

Tatara Systems : "The Benefits of Femtocells", http://www.tatarasystems.com/ (Retrieved Dec. 1, 2011).

Tatara Systems : "Femtocells: Why Now?", http://www.tatarasystems.com/ (Retrieved Dec. 1, 2011).

Tatara Systems : "Femtocell Architectures", http://www.tatarasystems.com/ (Retrieved Dec. 1, 2011).

GTP : Trillium GTP Software | Continuous Computing (CCPU), http://www.ccpu.com/trillium-protocol-software-products (Retrieved Dec. 1, 2011).

Femtocell Network Architecture—Airvana : http://www.airvana.com/technology/femtocell-network-architecture (Retrieved Dec. 1, 2011).

Femtocell . (n.d.). In Wikipedia. Retrieved Dec. 1, 2011, from http://en.wikipedia.org/w/index.php?title=Femtocell&oldid=461732259.

EE5517—Femtocells in 3G (CDMA2000 and UMTS), Mar. 28, 2011.

Seawright, Stephen, "Does the Market Really Need Femtocells?", Produce Design and Development, from http://www.pddnet.com/article-does-the-market-really-need-femtocells-102910/ (Retrieved Dec. 1, 2011).

* cited by examiner

SYSTEM AND METHOD FOR PROVIDING WIRELESS NETWORKS AS A SERVICE

CROSS-REFERENCE TO RELATED APPLICATIONS

The present application is a continuation-in-part of U.S. application Ser. No. 12/433,491, filed Apr. 30, 2009, which is a continuation-in-part of U.S. application Ser. No. 12/358,049, filed Jan. 22, 2009, the contents of which are incorporated herein by reference in their entirety.

TECHNICAL FIELD

The present invention relates to wireless networks. More particularly, the present invention relates to a system that provides a wireless network service to the owner of a venue desiring the network.

BACKGROUND

Wireless Local Area Networks ("WLANs") have been successfully deployed—initially in enterprise locations and subsequently in residential and outdoor public locations—for well over a decade. The evolution of enterprise WLAN systems has gone from (a) single Access Points ("APs") to (b) multiple autonomous APs interconnected, typically via Ethernet to a conventional switch/router to (c) most recently connecting the APs first to purpose-built, on-site WLAN controllers and then to the router.

These on-site controllers were deployed, typically in the wiring closet of an enterprise, by Information Technology ("IT") managers. The controller segregated non secure WLAN traffic from the secure wired network by authenticating wireless devices before they could access any core wired network services. They ensured physical security by removing any sensitive information "off the ceiling" (i.e., where the APs were located) to the equipment closet. In addition, they often provided a central secure source of power for the APs. And they provided for mobility between APs. Most importantly, they facilitate the centralized management of all WLAN operational aspects, such as security, privileges, upgrades, resource allocation, performance monitoring, and so on.

More recently, in-building licensed cellular radio systems, sometimes referred to as "femtocells," have also been introduced, sometimes to solve coverage problems a mobile carrier may have or to augment capacity for a carrier, both in targeted areas. A femtocell is sometimes referred to as a "home base station," "access point base station," "3G access point," "small cellular base station" or "personal 2G-3G base station." These femtocells have followed the same evolutionary paths as WLAN systems, starting as single radio devices and evolving to multi-radio systems that use either distributed antennas throughout the premise or a femto gateway to aggregate multiple femtocell radios in a manner analogous to the WLAN controller.

Indeed, most recently it is becoming possible for the access points and femtocells to be deployed as combined units, with the control function being provided by a single integrated controller/gateway.

With the recent trend toward outsourcing many IT functions to service providers and providing web-based services and applications, on-site network controllers present obstacles to such service providers. Accordingly, there is a need for both a system and a method for providing in-building wireless capabilities and wireless functionalities as a remotely operated service.

SUMMARY OF THE INVENTION

In one aspect, the invention provides a wireless network system. The wireless network system comprises: a wireless network controller; and a plurality of access points or femtocells on-site of the wireless network, the wireless network controller being (i) off-site of the wireless network, and (ii) in communication with each of the plurality of on-site wireless network access points or femtocells via an access data network, and the off-site wireless network controller being configured to perform at least one network control function for benefit of at least one of the plurality of on-site wireless network access points or femtocells, wherein the off-site wireless network controller is disposed at a location which is remote from the wireless network and the plurality of access points or femtocells, which are not disposed at the off-site wireless network controller location; and wherein the network controller may be in communication with at least one additional server, the at least one additional server being (i) co-located with one of the plurality of on-site wireless network access points or femtocells and (ii) configured to access an enterprise directory database, the enterprise directory database including information relating to authorized users of the wireless system; and wherein the off-site wireless network controller is in communication with the at least one additional server computer via a secured data link.

In another aspect, the invention provides a wireless network system, comprising: a wireless network controller; and one or more access points or femtocells, the wireless network controller being in communication with each of the plurality of access points or femtocells via an access data network, and the wireless network controller being configured to perform at least one network control function for benefit of at least one of the plurality of access points or femtocells, wherein the wireless network controller is remotely located and operated with respect to the plurality of access points or femtocells; and wherein the network controller may be in communication with at least one additional server, the at least one additional server being co-located with one of the plurality of access points or femtocells and configured to access an enterprise directory database, the enterprise directory database including information relating to authorized users of the wireless system; and wherein the wireless network controller is in communication with the at least one additional server computer via a secured data link.

The wireless network controller is disposed at the location of a service provider, and wherein the plurality of access points or femtocells are not disposed at the service provider location. The wireless network controller may be configured to perform at least one of: (i) management and operation of physical wireless network resources, (ii) provision of client authentication functions to limit network access to authorized users, (iii) provision of cross-subnet mobility, and (iv) administration of per-user functions.

Each of the plurality of access points or femtocells may be configured to automatically establish a connection to the wireless network controller. Each of the plurality of access points or femtocells may be configured to autonomously select a communications channel that enables said each access point or femtocell to communicate with at least one client device, the autonomous selection of the communication channel including selecting a channel with (i) a predetermined amount of self network interference and (ii) a predetermined amount of external network interference.

Each of the plurality of access points or femtocells may also have a respective unique identifier, and wherein the wireless network controller is configured to use the respective unique identifier to authenticate the corresponding access point or femtocell. The respective unique identifier may include at least one of: (i) a MAC address; (ii) a serial number; and (iii) femtocell ID.

The plurality of access points or femtocells may be configured to download network parameters from the wireless network controller, wherein the downloaded network parameters include at least one power level and at least one beacon setting. The downloaded network parameters may be predetermined to enable operation of the wireless system.

Each of the plurality of access points or femtocells may be configured to communicate with the access data network via at least one of a wired connection or a wireless mesh connection.

Each of the plurality of access points or femtocells may be configured to provide both secure private access and non-secure public access to the wireless system.

The wireless network controller may incorporate an administration portal function comprising at least one predetermined per-user administration task, wherein the at least one predetermined per-user administration task includes at least one of enabling new users and providing guest access.

The wireless system further comprises a local processor, and wherein the local processor is coupled to each of the plurality of access points or femtocells and in communication with the wireless network controller via the access data network.

In yet another aspect, the invention provides a method of providing a wireless network capability as a service. The method comprising the steps of: identifying a plurality of access points or femtocells as belonging to a wireless network; communicating with each of the plurality of access points or femtocells from a wireless network controller at a remote location via an access data network; remotely operating the wireless networks by performing at least one network control function for benefit of the plurality of access points or femtocells; and may interface to at least one additional server computer, the at least one additional server computer being co-located with one of the plurality of access points or femtocells and configured to access an enterprise directory database, the enterprise directory database including information relating to authorized users of the wireless network; and wherein the wireless network controller is in communication with the at least one additional server computer via a secured data link.

The method may further comprise the step of automatically downloading management and operational parameters to each of the plurality of access points or femtocells. The management and operational parameters may include at least one radio frequency transmit power level and at least one beacon setting. The management and operational parameters may be configurable at the wireless network controller.

The method may further comprise the step of automatically downloading at least one software image to at least one selected access point or femtocell. The at least one selected access point or femtocell may be capable of storing the at least one software image in a first operating bank and operating on the wireless network from a second operating bank. The wireless network controller may be capable of controlling the first and second operating banks.

The method may further comprise the step of receiving information corresponding to selected local operational parameters from each of the plurality of access points or femtocells, including at least one of receiving an operational alarm relating to a fault condition; receiving information relating to traffic throughput and loading; receiving information relating to one of self network interference or external network interference; and receiving information relating to radio coverage. The method may further comprise the step of applying a threshold to incoming operational alarms. The method may further comprise the step of logging parameters corresponding to the received information.

The method may further comprise the step of authenticating a client device to the wireless network by transmitting a message to at least one access point or femtocell, the message including information relating to the authenticating. The step of authenticating may further comprise tunneling a client device MAC address through the access data network using a predetermined tunneling protocol.

The method may further comprise the steps of assigning a respective unique identifier to each of the plurality of access points or femtocells; and using the respective unique identifier to authenticate the corresponding access point or femtocell. The respective unique identifier may include at least one of: (i) a MAC address; (ii) a serial number; and (iii) femtocell ID.

The method may further comprise the step of providing both secure private access and non-secure public access to the wireless network. The step of providing non-secure public access to the wireless network system may further comprise instructing at least one predetermined access point or femtocell to transmit a visitor beacon and segregating traffic for visitor terminals that associate with the transmitted visitor beacon from the remainder of the wireless network by using one of a virtual local area network or traffic tunneling.

The method may further comprise the step of enabling a user of a predetermined one of the plurality of access points or femtocells to access an administration portal function, thereby enabling the user of the predetermined access point or femtocell to administer the at least one network control function.

DESCRIPTION OF THE DRAWINGS

These and other advantages of the present invention will be readily understood with reference to the following specifications and attached drawings wherein.

DETAILED DESCRIPTION

Preferred embodiments of the present invention will be described hereinbelow with reference to the accompanying drawings. In the following description, well-known functions or constructions are not described in detail because they may obscure the invention in unnecessary detail.

With the recent trend toward outsourcing many IT functions to service providers and providing web-based services and applications, the present inventors have recognized that an opportunity exists to "externalize" the wireless controller functions (e.g., wireless local area networks ("WLAN") and cellular applications) as well. This trend is also in keeping with the recent moves to centralized "cloud computing" in which many IT-related capabilities are provided "as a service" from the Internet without customer knowledge of, expertise with, or control over the technology infrastructure that supports the capabilities. Historically, this evolution is similar to that of enterprise voice telephone systems, which initially used on-premise Private Automatic Branch Exchanges (PABX) and Electronic Key Telephone Systems (EKTS). Then, telephone companies also began to deliver feature-rich services from within the network using Centrex software and featured phones.

The opportunity exists with WLAN for a service provider—wired or wireless—to own the WLAN equipment, deploy the WLAN equipment in the enterprise, and remotely operate and maintain that equipment, all for a monthly fee. The same methodology may be applied to femtocell networks, described below. Typically, in either scenario, a flat monthly fee will be paid, based on the area covered, the performance offered, and so on, thus enabling a differentiated bronze/silver/gold "tariff" scheme. Such an approach eliminates any upfront capital cost for the enterprise. A further benefit of this approach is that it frees the Information Technology (IT) manager from the complexities of deploying and operating a wireless system, and it eliminates the risks and operating costs associated with equipment failures, performance shortfalls, and ongoing upgrades. The service provider performs continuous network monitoring of WLAN and cellular operation and performance on a 24-hours-per-day, seven-days-per-week basis, troubleshooting and repairing or replacing access points (APs) or femtocells as required. The service provider adds or upgrades equipment to meet agreed coverage and capacity specifications, as stipulated in the service agreement with the customer.

This new "hosted" wireless service affords an opportunity for the service provider to enter the enterprise data business, thereby creating a new incremental revenue stream. By centralizing operations across multiple customers, the service provider will typically be able to offer the service at very cost-competitive rates, as compared with the cost of an outright purchase.

In a system according to a preferred embodiment of the present invention, the architecture also allows for an additional layer of indirection, where third parties, such as equipment vendors or system integrators, provide the network controllers and application software, hosted on their own computing platforms, to the service providers. The service providers, in turn, deal directly with the venue owners.

In accordance with a preferred embodiment of the present invention, these wireless networks enable both secure private access for the user population within the enterprise, as well as ready access for roaming visitors to the enterprise. In the latter case, the network appears to the visitor like a public "hotspot" consistent with that being provided by the service provider in a wide variety of other public areas. Such public access provides an additional revenue stream for the service provider that is deploying the managed network.

Functions

Controller

Figure 1:
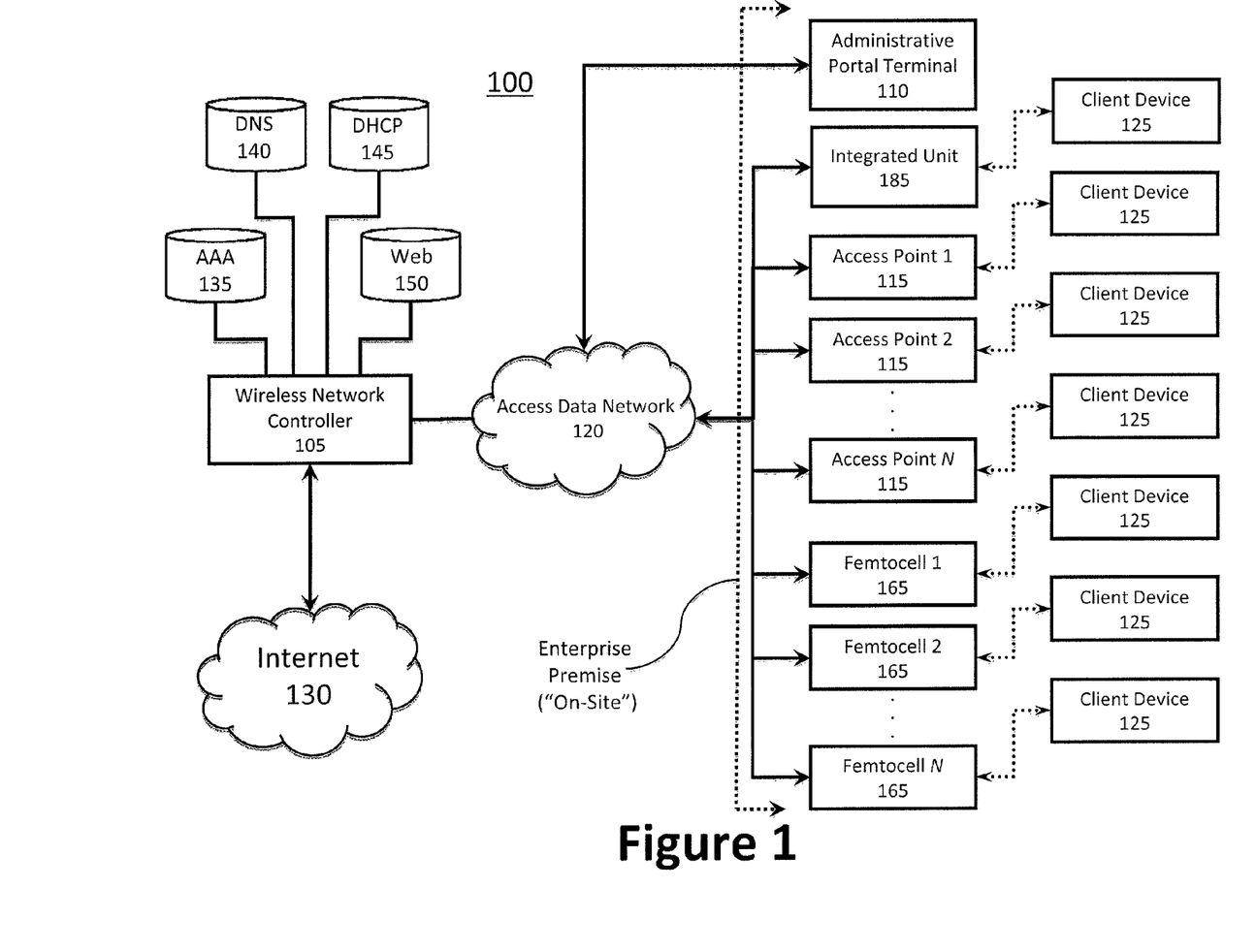
FIG. 1 illustrates a block diagram of a wireless network that uses a remotely located network controller, according to a preferred embodiment of the invention.

In a preferred embodiment of the present invention, referring to FIG. 1, a wireless network 100 includes access points (APs) 115, femtocells 165, and an off-site wireless network controller 105 that is connected to the APs 115 and/or femtocells 165 via an access data network 120. The wireless network may be, for example, a WLAN or other network enabled to link a client device (e.g., via a femtocell 165, AP 155, etc.) to the service provider. As illustrated in the figure, the wireless controller 105 is centrally located within the network 100, preferably "off-site"—such as the service provider's side. The wireless network controller 105 performs all of the functions that are typically implemented by on-premises wireless controllers for conventional wireless networks; and the wireless network controller 105 may also perform additional functions. Such "hosted" wireless network controller 105 can be owned and operated by the service provider; alternatively, the wireless network controller 105 can even be outsourced to a third party who provides the wireless network controller 105 and/or the management application software, which in turn are operated by the service provider.

Client devices 125 are connected to the wireless network 100 via one or more APs 115 or femtocells 165. Depending on the user's needs and network's design, a system may be equipped with (1) only APs 115, (2) only femtocells 165, or (3) a combination of both APs 115 and femtocells 165, where the APs and femtocells may be combined in integrated units 185. The wireless network 100 may be connected to the Internet 130 via the network controller 105, or directly via the access data network 120, to provide the client device 125 access to a public network (e.g., the internet 130).

Generally speaking, a femtocell 165 is a small cellular base station for use in environments where a wireless signal may not be readily available. As illustrated, the femtocell 165 may connect to the network 100 via the transport data mechanism 120, which may include a broadband connection (e.g., DSL or cable) and, depending on the size and power of the femtocell 165, can support a plurality of mobile client devices 125. Thus, a common objective of femtocell technology is to allow service providers to extend service coverage to environments where access would otherwise be limited or unavailable—without the need for expensive cellular towers or additional access points. Employing a femtocell 165 can also decrease backhaul costs, since it routes mobile phone traffic through the IP network. For general information on femtocells and femtocells as applied to 3G applications, see, for example, the paper entitled *EE5517 Femtocells in 3G (CDMA2000 and UMTS)*, dated Mar. 28, 2011.

Another benefit of femtocells 165 is that they operate in the licensed frequency spectrum, essentially a small cellular base-station, and conform to FCC transmission requirements.

Authentication is typically required by either the service provider or operator (e.g., via the wireless network controller 105) to ensure that valid access points 115 or femtocells 165 and client devices 125 are connecting to the network 100. As disclosed herein, the service provider may remotely authenticate, or deny, a client device 125 using the wireless network controller 105.

The access point 115 or femtocell 165 may also support a feature known as local breakout, which allows an access point or femtocell user to connect a client device 125 to a local home or office network without traversing the mobile operator's core network.

The wireless network controller 105 is preferably implemented by the use of one or more general purpose computers, such as, for example, a Dell PowerEdge, or a Hewlett-Packard ProLiant DL server. Client devices 125 are typically personal computers, such as laptop computers, handheld palm/personal digital assistant (PDA) devices, or portable communication devices including, for example, cellular device such as phones and smart phones. Each of the network controller 105, the APs 115, femtocells 165 and the client devices 125 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), an erasable programmable read-only memory (EPROM), or the like. Each of the network controller 105, the APs 115, femtocells 165, and the client devices 125 can also include computer memory, such as, for example, random-access memory (RAM) or EEPROM/Flash. However, the computer memory of the wireless network controller 105 can be any type of computer memory or any other type of electronic storage medium that is located either internally or externally to the network controller 105, such as, for example, read-only memory (ROM), compact disc read-only memory (CDROM), electro-optical memory, magneto-optical memory, electrically-erasable programmable read-only memory (EEPROM), or the like.

According to exemplary embodiments, the respective RAM or EEPROM can contain, for example, the operating program for any of the network controller 105, the APs 115, femtocells 165, or the client devices 125. As will be appreciated based on the following description, the RAM can, for example, be programmed using conventional techniques known to those having ordinary skill in the art of computer programming. The actual source code or object code for carrying out the steps of, for example, a computer program can be stored in the RAM. Each of the network controller 105, the APs 115, femtocells 165, integrated units 185, and the client devices 125 can also include a database. The database can be any type of computer database for storing, maintaining, and allowing access to electronic information stored therein.

The wireless network controller 105 functions may be segregated into four major parts. The first part includes the management and operation of the physical network resources, which are typically performed by the service provider. The second part includes the provision of client authentication functions to limit network access to authorized users. The third part includes the provision of cross-location (often also referred to as "cross-subnet") mobility. A fourth set of functions includes the administration of all remaining "per-user" functions, which typically are performed by on-site IT personnel.

Management and Operation

The wireless network controller 105 performs various configurations, fault monitoring, and performance monitoring functions, including the following: (1) Automatic download of all required configuration information to APs 115 and/or femtocells 165 at power-up/power cycle, including, for example: Power levels and/or Beacon (Service Set Identifier or SSID) settings; (2) Automatic upgrades of APs 115 and/or femtocells 165 to the latest software loads, without intervention by on-site personnel; (3) Remote commissioning of all APs 115 and/or femtocells 165; (4) Continuous real-time monitoring of network operation, including (a) All APs 115 and/or femtocells 165 are contacted regularly to ensure they are alive, (b) All alarms from APs 115 and/or femtocells 165 are monitored in real-time, (c) Thresholding of parameters being alarmed, and (d) Logging of events; (5) Remote diagnosis of all APs 115 and/or femtocells 165; and (6) Continuous real-time monitoring of network performance, including, for example, (a) Throughput and loading, (b) Interference—both self- and external networks and devices, (c) Coverage, (d) Thresholdable alarms, and (e) Maintained logs of all selected parameters.

Client Authentication

The wireless network controller 105 provides for centralized client device conditional access to support user authentication, thereby simplifying operations and enabling scaling to large networks with many thousands of users. The authentication can be used to provide both private and public access to the network as desired.

Mobility

When APs 115 and/or femtocells 165 or groups of APs 115 and/or femtocells 165 are located in different buildings, different APs 115 and/or femtocells 165 within the same network (e.g., a cellular or WLAN Network) may be connected to the transport network 120 via different routers and hence different IP subnets. To facilitate mobility of Layer-2 (e.g., Wi-Fi) devices across subnets, Layer-2 MAC address information must be communicated with the central network controller 105.

Per-User Administrator Access

In a preferred embodiment of the present invention, an administrator portal may be included in order to enable on-site personnel to perform any required per-user administration tasks. Such tasks may include enabling new wireless users and providing guest access to the wireless network 100. The administrator portal is preferably implemented as a web-based application running on the network controller 105, accessible to an on-site administrator via a conventional web browser.

Using the administrator portal 110, the on-site administrator can configure his particular enterprise account and settings, including information such as the following: (1) Site name and address; (2) Network beacons (e.g., SSIDs)—broadcast or hidden; (3) List of registered users; and (4) Other profiles.

Additional Functions

Additional functions that may be performed by the wireless network controller 105 include the following: (1) Per-user bandwidth rate limiting; (2) Traffic prioritization; (3) Content filtering; (4) Client-to-client isolation; (5) Intrusion detection and protection; and (6) AP load balancing.

The wireless network controller 105 is typically interfaced to additional network servers, such as: (1) Web server 150 for authentication splash pages, advertising, etc.; (2) Remote Authentication Dial In User Service (RADIUS) server 135 for authentication, authorization, and accounting (AAA) purposes; (3) Dynamic Host Configuration Protocol (DHCP) server 145 for automatic client Internet Protocol (IP) address assignment; (4) Domain Name Service (DNS) server 140 for Internet name resolution; (5) Billing server; (6) Customer Relationship Management (CRM) server to track account and trouble ticket information; and (7) Database (e.g., Structure Query Language—SQL) and interchange interfaces (e.g., Comma-Separated Values (CSV) files) for off-line processing of data.

Any or all of these servers may be integrated into the wireless network controller 105 for smaller deployments, thereby simplifying and reducing the cost of such deployments.

In order to ease installation by non-IT personnel, such as electricians, the on-site APs 115 and/or femtocells 165 need only be provided with electrical power. In this case, the APs 115 and/or femtocells 165 are interconnected to form a path back to the wired connection point to the network 100 using, for example, wireless mesh radio connections.

Figure 2:
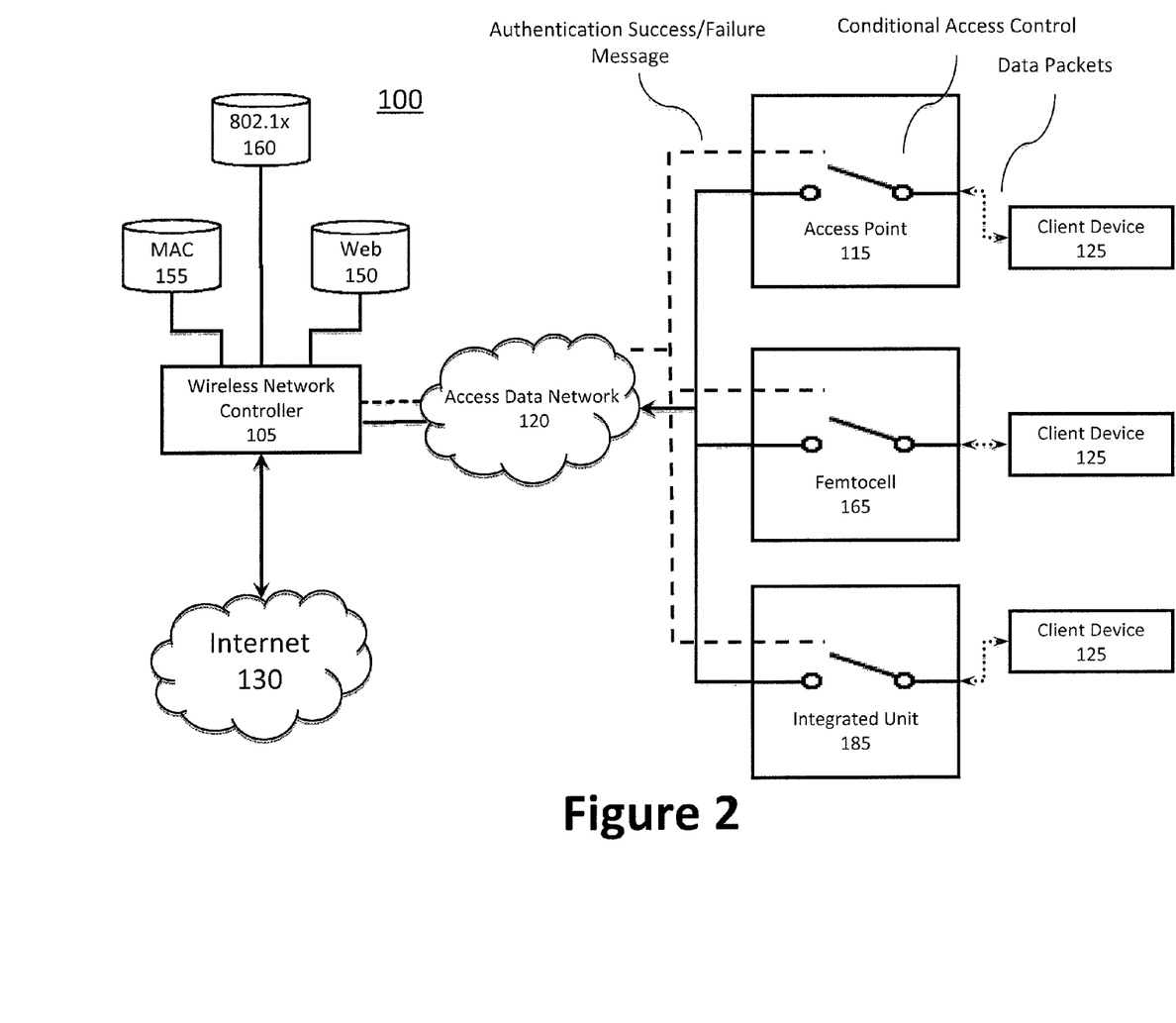
FIG. 2 illustrates a block diagram for communications within the wireless network of FIG. 1 using a conditional access control switch that is controlled by an authentication message sent to an access point or femtocell, according to a preferred embodiment of the invention.

In a preferred embodiment of the invention, the APs 115 may allow for each of the following: (1) both wired and wireless mesh connections of the APs 115 back to the wired connection point to the network 100. Wired connection is automatically selected if present, with fall back to wireless connections between APs 115 if the APs 115 are so enabled; (2) Fully automatic configuration of operational parameters, including channel selection to minimize self and adjacent network interference; (3) Fully automatic discovery by the network controller 105; (4) Each AP 115 has a unique identifier assigned by the service provider (e.g., a serial number or Media Access Control (MAC) address, stored in MAC Address server 155 as shown in FIG. 2), which is used to authenticate the AP 115 with the wireless network controller 105 on power-up; (5) Automatic download of all running configuration parameters, including power levels, beacon (SSID) settings, etc.; (6) APs 115 may have dual memory banks, thus allowing one memory bank to receive downloads from the controller while the AP continues to execute from the other memory bank; and (7) Upgrades may then be performed at scheduled maintenance windows by simply switching the active memory bank.

Similarly, the femtocells 165 may allow for each of the following: (1) a wired and/or wireless connections of the femtocell 165 back to the wired connection point to the network 100. As with APs 115, the wired connection is automatically selected if present, with a fallback to wireless connections between APs 115 and/or femtocells 165 if said devices are so enabled; (2) fully automatic configuration of operational parameters, including channel selection to minimize self- and adjacent network interference; (3) Fully automatic discovery by the network controller 105; (4) like APs 115, each femtocell 165 preferably has a unique identifier assigned by the service provider (e.g., femtocell ID, serial number, etc.), which is used to authenticate the femtocell 165 with the wireless network controller 105 on power-up; (5) Automatic download of all running configuration parameters, including power levels, beacon (SSID) settings, etc.; (6) femtocell 165 may have dual memory banks, thus allowing one memory bank to receive downloads from the controller while the femtocell 165 continues to execute from the other memory bank; and (7) Upgrades may then be performed at scheduled maintenance windows by simply switching the active memory bank.

Architecture

Referring to FIG. 1, in accordance with a preferred embodiment of the present invention, the APs 115 and/or femtocells 165 are connected to an access data network 120 either directly (e.g., via a digital subscriber line (DSL) or cable modem) or, when there are multiple APs 115 and/or femtocells 165 per location, via an on-premise switch (not shown). Typically, data traffic is routed directly to its destination via the access data network 120 and then the Internet 130, although, for some applications, the data traffic may be "tromboned" through the wireless network controller 105 for mobility purposes, as further described below.

Each AP 115 and/or femtocell 165 implements the conditional access function, whereby no user traffic is enabled onto the network 100 until the user client device is authenticated. The conditional access function is similar to the function performed by IEEE 802.1x Authenticator devices. In a preferred embodiment of the present invention, the conditional access function is performed regardless of the type of authentication being performed. There are several different authentication schemes for use with an AP 115 that may be used, including the following: MAC address "white list" authentication; web page redirect authentication; and EAP (username/password, certificate or SIM card) authentication.

Similarly, femtocells use over-the-air security mechanisms, akin to those used in macrocell radio networks. However, additional security capabilities need to be supported to protect against threats that originate from the Internet or through tampering with the femtocell itself. Therefore, femtocell network architecture also provides network access security, and includes femtocell authentication and authorization procedures to protect against fraud. To enable authentication, a security gateway network node may be inserted (e.g., on the service provider side of the network 100) that secures the Internet connection between femtocell users and/or the femtocell itself and the mobile operator core network. The security gateway may use standard Internet security protocols such as Internet Protocol Security "IPSec" and IKEv2 to authenticate and authorize femtocells and provide encryption support for all signaling and user traffic. For additional information on Femtocell Network Architecture, see for example, http://www.airvana.com/technology/femtocell-network-architecture/.

Regardless of the conditional access function implemented, in a preferred embodiment, the wireless network controller 105 is used to provide centralized client device conditional access, which may be implemented via an administrator portal that enables on-site personnel to perform any required per-user administration tasks.

Referring to FIG. 2, in a preferred embodiment of the present invention, the APs 115 and/or femtocells 165 perform the conditional access function, ignoring all data packets from clients (also referred to as "supplicants"), until the wireless network controller 105 signals successful authentication of the user, at which time data traffic is enabled on to the network 100 by the AP 115 and/or femtocell 165. For the case in which MAC authentication is employed, MAC addresses are forwarded from server 155 to the wireless network controller 105 for validation, as further described below. For the cases of web redirect and 802.1x authentication, messaging, as used in Extensible Authentication Protocol (EAP) or bespoke html messages, is used to communicate between the AP 115 and the wireless network controller 105 regardless of which authentication method being used by the network controller 105. Both of the 802.1x RADIUS server 160 and the web server 150 are interfaced centrally by the network controller 105. Further, this same approach can be extended for use with a variety of other authentication schemes. The various schemes are needed to satisfy the needs of both private and public network access control.

Figure 3:
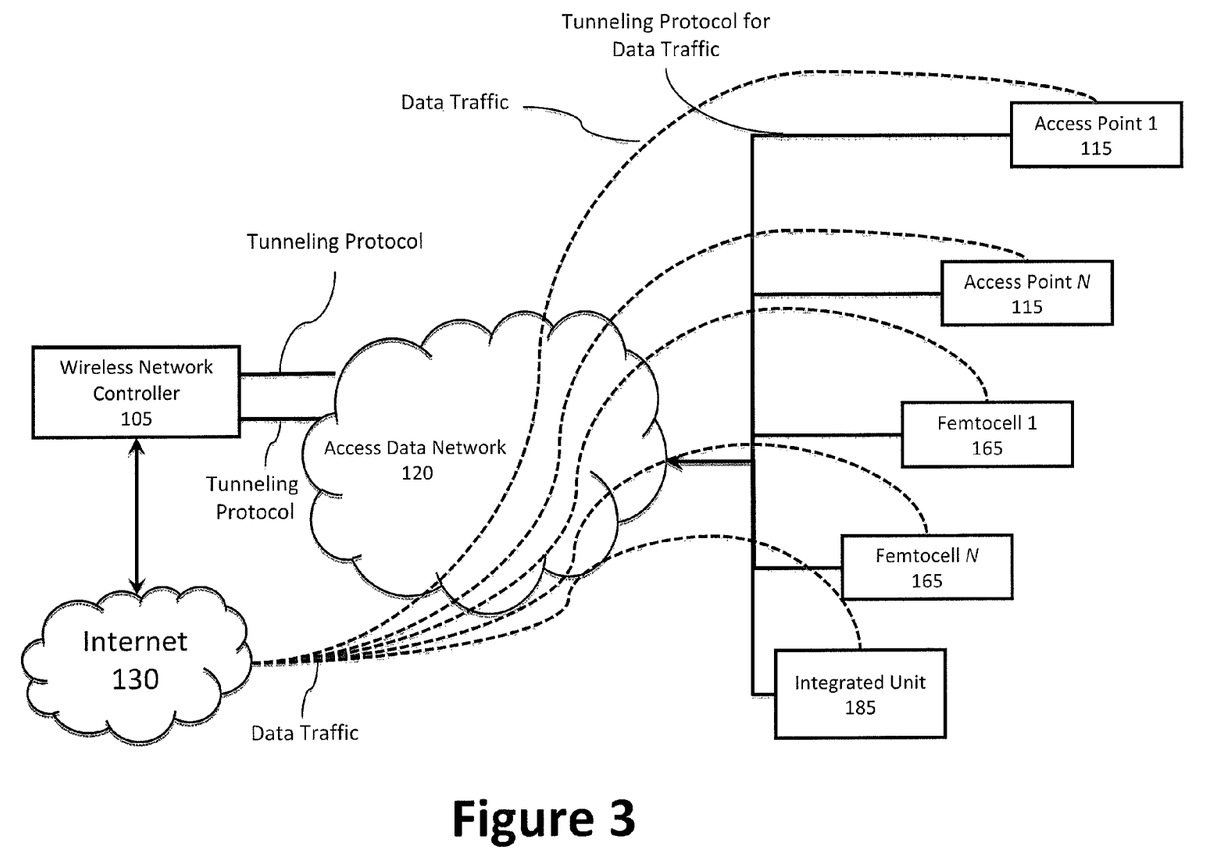
FIG. 3 illustrates a block diagram for communications within the wireless network of FIG. 1 using a tunneling protocol for authentication traffic, according to a preferred embodiment of the invention.

Referring to FIG. 3, client MAC address information, as required for MAC authentication, can be communicated to the centralized wireless network controller 105, typically by tunneling. Any of these communication modes may be used to enable the MAC address information to traverse the network 100 back to the network controller 105. Tunneling may be performed by any of a variety of protocols, including Layer 2 Tunneling Protocol (L2TP), Generic Routing Encapsulation (GRE), or other similar techniques. For example, where L2TP is used, the AP 115 performs the L2TP Access Control (LAC) function, while the wireless network controller 105 performs the L2TP Network Server (LNS) function. Often, the tunneling protocols offer the additional benefit of providing an encrypted link between the AP 115 and the network controller 105. Similarly, tunneling protocols may be used with the femtocells 165. Exemplary protocols include, for example, General Packet Radio Service (GPRS) Tunneling Protocol (GTP), which may include both signaling and data transfer procedures.

Figure 4:
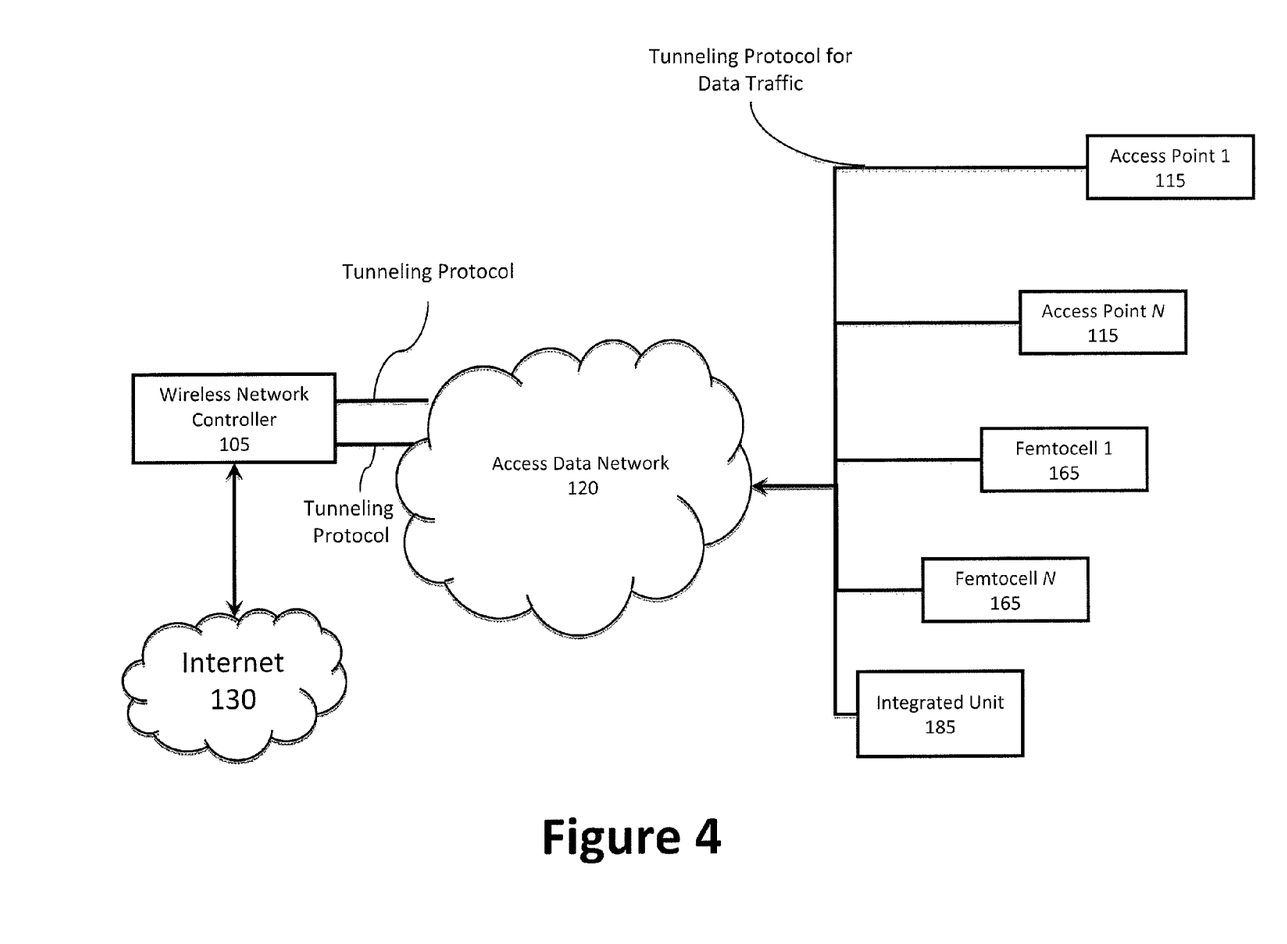
FIG. 4 illustrates a block diagram for communications within the wireless network of FIG. 1 using a tunneling protocol for data traffic, according to a preferred embodiment of the invention.

Referring also to FIG. 4, for situations in which client mobility across APs 115, femtocells 165, or across network locations is desired, tunneling protocols may be further employed to forward all client MAC addresses between Tunnel End Points (TEPs) from the APs 115 and/or femtocells 165. In this configuration, preferably all traffic is tunneled to the network controller 105. The wireless network controller 105 may use standard MAC address-based forwarding techniques, such as Rapid Spanning Tree Protocol (RSTP), to ensure that packets are forwarded to the appropriate switch port for delivery to the appropriate location and AP 115 or femtocell. IP addresses of the client devices are not required to change as clients move from one AP 115 or one network location to another, regardless of the IP routing configuration used to interconnect each of those locations to the access data network 120. However, scaling a large Layer-2 forwarded network requires that several aspects be properly accounted for, including MAC address table sizes, bridge configuration and learning, broadcast filtering, and other relevant factors.

In a preferred embodiment of the present invention, the computer hardware that is employed as the wireless network controller 105 is typically selected from the variety of industry standard computing platforms, with possible hardware acceleration in large networks for tunnel end points. Key attributes include: (1) A rack-mount network computing appliance; (2) Optional hardware acceleration, e.g., for tunnel end point encryption functions; (3) High speed core network interfaces, such as, for example, 10 GigEthernet; (4) Local 10/100/1000 BaseT Ethernet and other industry-standard computing interfaces such as Peripheral Component Interconnect (PCI) and Universal Serial Bus (USB); and (5) Industry-standard operating system software such as Windows, Linux, and Solaris.

For situations in which the size of the network 100 does not justify investment in a fully centralized wireless network controller 105—such as, for example, a small provider, a highly localized deployment, or inadequate connectivity from the enterprise to the network—all of the same functions can be provided by a local on-site version of the network controller 105. Such a local wireless network controller 105 may still be remotely accessed and operated by the service provider.

In very large networks 100, the wireless network controller 105 functions may be distributed, with low level functions, such as data collection, being performed by using on-site equipment, and top-level coordination and analysis of the per-site devices being performed centrally at the remote network controller 105. A specific example of this is where the DHCP client IP address assignment function is performed locally within the APs 115 or femtocells 165, for example, to reduce the number of unique addresses required across the entire network. In this example, a Network Address Translation (NAT) function is also performed in the AP or femtocell to and IP local addresses are assigned from a local pool.

Figure 5:
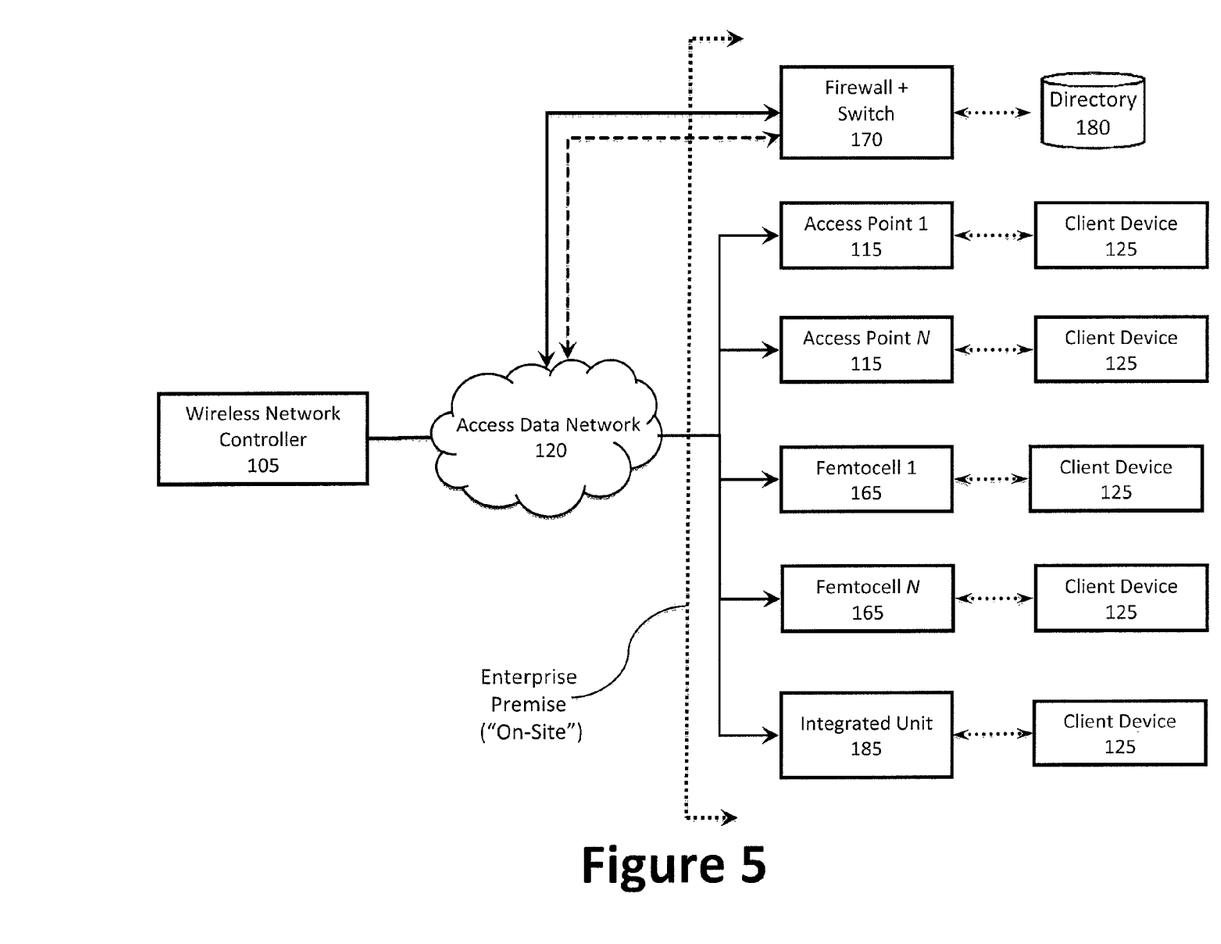
FIG. 5 illustrates a block diagram for communications within the wireless network of FIG. 1 using a directory database that is securely maintained behind the firewall of an enterprise, according to a preferred embodiment of the invention.

Referring to FIG. 5, another example of a situation in which the network controller function is distributed is illustrated in a block diagram showing that the network controller uses one or more enterprise directory databases 180 to maintain information about authorized users of the wireless network. In many enterprises, servers such as Lightweight Directory Access Protocol (LDAP) and Active Directory (AD) are securely maintained behind the enterprise's firewall 170 and are used to maintain the list of authorized users of the existing network. The network controller is treated as a trusted partner of the enterprise and is granted remote access to the enterprise directory, for example, using Active Directory Federation Services. Using these services, the wireless network controller 105 would remotely access the enterprise's directory database 180 using a secured data link rather than duplicating the contents of the database in the service provider's central location. The directory database(s) 180 may be located at any number of branch locations or at one centralized headquarters location and are used by the wireless network controller 105 to authorize access at all locations.

While the foregoing detailed description has described particular preferred embodiments of this invention, it is to be understood that the above description is illustrative only and not limiting of the disclosed invention. While preferred embodiments of the present invention have been shown and described herein, it will be obvious to those skilled in the art that such embodiments are provided by way of example only. Numerous variations, changes, and substitutions will now occur to those skilled in the art without departing from the invention.

What is claimed is:

1. A wireless network control system, comprising: a wireless network controller; and a plurality of femtocells on-site of the wireless network, the wireless network controller being (i) off-site of the wireless network, and (ii) in communication with each of the plurality of on-site wireless network femtocells via a wired access data network, and the off-site wireless network controller being configured to perform substantially all network control functions for benefit of at least one of the plurality of on-site wireless network femtocells via the wired access data network, the substantially all WLAN network control functions including at least (i) management and operation of physical network resources, (ii) provision of client authentication functions to limit network access to authorized users, (iii) provision of cross-subnet mobility, and (iv) administration of per-user functions, wherein the off-site wireless network controller is disposed at a location which is remote from the wireless network and the plurality of femtocells, which femtocells are not disposed at the off-site wireless network controller location wherein the substantially all WLAN network control functions performed by the network controller are performed external of the WLAN; and wherein the network controller is in communication with at least one additional server, the at least one additional server being (i) co-located with one of the plurality of on-site wireless network femtocells and (ii) configured to access an enterprise directory database, the enterprise directory database including information relating to authorized users of the wireless system; and wherein the off-site wireless network controller is in communication with the at least one additional server computer via a secured data link.

2. The wireless network system according to claim 1, wherein the off-site wireless network controller performs the additional functions of (1) per-user bandwidth rate limiting, (2) traffic prioritization; (3) content filtering, and (4) intrusion detection.

3. A wireless network control system, comprising: a wireless network controller; and a plurality of femtocells, the wireless network controller being in communication with each of the plurality of femtocells via a wired access data network, and the wireless network controller being configured to perform substantially all network control functions for benefit of at least one of the plurality of femtocells via the wired access data network, the substantially all network control functions comprising: (i) management and operation of physical wireless network resources, (ii) provision of client authentication functions to limit network access to authorized users, (iii) provision of cross-subnet mobility, and (iv) administration of per-user functions, wherein the wireless network controller is remotely located and operated with respect to the plurality of femtocells; and wherein the network controller is in communication with at least one additional server, the at least one additional server being co-located with one of the plurality of femtocells and configured to access an enterprise directory database, the enterprise directory database including information relating to authorized users of the wireless system; and wherein the wireless network controller is in communication with the at least one additional server computer via a secured data link.

4. The system according to claim 3, wherein the wireless network controller is disposed at the location of a service provider, and wherein the plurality of access points or femtocells are not disposed at the service provider location.

5. The system according to claim 3, wherein at least one of the plurality of femtocells is integrated with an access point.

6. The system according to claim 3, wherein each of the plurality of femtocells is configured to automatically establish a connection to the wireless network controller via the wired access data network.

7. The system according to claim 3, wherein each of the plurality of femtocells is configured to autonomously select a communications channel that enables said each femtocell to communicate with at least one client device, the autonomous selection of the communication channel including selecting a channel with (i) a predetermined amount of self network interference and (ii) a predetermined amount of external network interference.

8. The system according to claim 7, wherein the respective unique identifier includes at least one of: (i) a MAC address; (ii) a serial number; and (iii) femtocell ID.

9. The system according to claim 3, wherein each of the plurality of femtocells has a respective unique identifier, and wherein the wireless network controller is configured to use the respective unique identifier to authenticate the corresponding femtocell.

10. The system according to claim 3, wherein each of the plurality of femtocells is configured to download network parameters from the wireless network controller via the wired access data network, wherein the downloaded network parameters include at least one power level and at least one beacon setting.

11. The system according to claim 10, wherein the downloaded network parameters are predetermined to enable operation of the wireless system.

12. The system according to claim 3, wherein each of the plurality of femtocells is configured to communicate with the wired access data network via at least one of a wired connection and a wireless mesh connection.

13. The system according to claim 3, wherein each of the plurality of femtocells is configured to provide both secure private access and non-secure public access to the wireless system.

14. The system according to claim 3, wherein each of the plurality of femtocells is configured to enable an on-site administrator to perform an administration portal function comprising at least one predetermined per-user administration task, wherein the at least one predetermined per-user administration task includes at least one of enabling new users and providing guest access.

15. The system according to claim 3, wherein each of the plurality of femtocells is configured to perform at least one of the additional server functions.

16. The system according to claim 3, wherein the wireless system further comprises a local processor, and wherein the local processor is coupled to each of the plurality of femtocells and in communication with the off-site wireless network controller via the access data network.

17. A method of providing a wireless network control capability as a service, the method comprising the steps of:
identifying a plurality of access points or femtocells as belonging to a wireless network not located at or operated by a service provider; the service provider communicating with each of the non-service-provider-operated plurality of access points or femtocells from a service-provider-operated wireless network controller at a remote location via a wired access data network, the remote location being at the service provider; the service provider remotely operating the wireless network by performing substantially all control functions for benefit of the plurality of access points or femtocells via the wired access data network, the substantially all WLAN network control functions including at least (i) management and operation of physical network resources, (ii) provision of client authentication functions to limit network access to authorized users, (iii) provision of cross-subnet mobility, and (iv) administration of per-user functions; and the service provider interfacing to at least one additional server computer, the at least one additional server computer being co-located with one of the plurality of access points or femtocells and configured to access an enterprise directory database, the enterprise directory database including information relating to authorized users of the wireless network; and wherein the service provider is in communication with the at least one additional server computer via the wireless network controller and a secured data link.

18. The method according to claim 17, wherein the wireless network controller is configured to perform performs the additional functions of (1) per-user bandwidth rate limiting, (2) traffic prioritization; (3) content filtering, and (4) intrusion detection for plurality of access points or femtocells.

19. The method according to claim 17, wherein the substantially all network control functions are not performed by an operator of the wireless network controller.

20. The method according to claim 17, wherein each of the plurality of access points or femtocells is configured to automatically establish a connection to the wireless network controller via the wired access data network.

21. The method according to claim 17, wherein each of the plurality of access points or femtocells is configured to autonomously select a communications channel that enables said each access point or femtocell to communicate with at least one client device, the autonomous selection of the communication channel including selecting a channel with (i) a predetermined amount of self network interference and (ii) a predetermined amount of external network interference.

22. The method according to claim 17, wherein each of the plurality of access points or femtocells has a respective unique identifier, and wherein the wireless network controller is configured to use the respective unique identifier to authenticate the corresponding access point or femtocell.

23. The method according to claim 22, wherein the respective unique identifier includes at least one of: (i) a MAC address; (ii) a serial number; and (iii) femtocell ID.

24. The method according to claim 17, wherein each of the plurality of access points or femtocells is configured to download network parameters from the wireless network controller, wherein the downloaded network parameters include at least one power level and at least one beacon setting.

25. The method according to claim 24, wherein the downloaded network parameters are predetermined to enable operation of the wireless system.

26. The method according to claim 17, wherein each of the plurality of access points or femtocells is configured to communicate with the wired access data network via at least one of a wired connection and a wireless mesh connection.

27. The method according to claim 17, wherein each of the plurality of access points or femtocells is configured to provide both secure private access and non-secure public access to the wireless system.

28. The method according to claim 17, wherein each of the plurality of access points of femtocells is configured to enable an on-site administrator to perform an administration portal function comprising at least one predetermined per-user administration task, wherein the at least one predetermined per-user administration task includes at least one of enabling new users and providing guest access.

29. The method according to claim 17, wherein each of the plurality of access points or femtocells is configured to perform at least one of the additional server functions.

30. The method according to claim 17, wherein the wireless system further comprises a local processor, and wherein the local processor is coupled to each of the plurality of access points or femtocells and in communication with the off-site wireless network controller via the access data network.

* * * * *

UNITED STATES PATENT AND TRADEMARK OFFICE
CERTIFICATE OF CORRECTION

| | | |
|---|---|---|
| PATENT NO. | : 8,472,920 B2 | Page 1 of 1 |
| APPLICATION NO. | : 13/338511 | |
| DATED | : June 25, 2013 | |
| INVENTOR(S) | : Herscovici et al. | |

It is certified that error appears in the above-identified patent and that said Letters Patent is hereby corrected as shown below:

On the Title Page, Item (56), under "OTHER PUBLICATIONS", in Column 2, Line 2, delete "PCTICA201 0/00049," and insert -- PCT/CA2010/00049, --, therefor.

In the Specification

In Column 4, Line 42, delete "DESCRIPTION OF THE DRAWINGS" and insert -- BRIEF DESCRIPTION OF THE DRAWINGS --, therefor.

In Column 6, Lines 42-43, delete "data mechanism 120," and insert -- data network 120, --, therefor.

In the Claims

In Column 12, Lines 47-48, in Claim 1, delete "location wherein" and insert -- location, wherein --, therefor.

In Column 14, Line 25, in Claim 17, delete "all control functions" and insert -- all network control functions --, therefor.

In Column 14, Line 44, in Claim 18, delete "perform performs" and insert -- perform --, therefor.

Signed and Sealed this
Twenty-second Day of April, 2014

Michelle K. Lee
*Deputy Director of the United States Patent and Trademark Office*